United States Patent
Lee et al.

(10) Patent No.: US 7,403,321 B2
(45) Date of Patent: Jul. 22, 2008

(54) OPTICAL MICROELECTROMECHANICAL DEVICE

(75) Inventors: Chia-Sheng Lee, Taichung (TW); Han-Tu Lin, Wuci Township, Taichung County (TW); Jia-Fam Wong, Hsinchu (TW)

(73) Assignee: AU Optronics Corp., Hsinchu (TW)

( * ) Notice: Subject to any disclaimer, the term of this patent is extended or adjusted under 35 U.S.C. 154(b) by 174 days.

(21) Appl. No.: 11/133,101

(22) Filed: May 19, 2005

(65) Prior Publication Data

US 2006/0146396 A1     Jul. 6, 2006

(30) Foreign Application Priority Data

Dec. 30, 2004   (TW) ............................... 93141337 A

(51) Int. Cl.
  *G02B 26/00* (2006.01)
  *G02B 26/08* (2006.01)
(52) U.S. Cl. ...................... 359/291; 359/223
(58) Field of Classification Search ................ 359/290, 359/291, 223, 224, 295
See application file for complete search history.

(56) References Cited

U.S. PATENT DOCUMENTS

| | | | |
|---|---|---|---|
| 6,055,090 A | 4/2000 | Miles ........................ 359/291 |
| 6,215,579 B1 | 4/2001 | Bloom et al. ............... 359/298 |
| 6,574,033 B1 | 6/2003 | Chui et al. .................. 359/291 |
| 6,674,562 B1 | 1/2004 | Miles ........................ 359/291 |
| 2002/0015215 A1 | 2/2002 | Miles ........................ 359/290 |
| 2002/0024711 A1 | 2/2002 | Miles ........................ 359/247 |
| 2002/0075555 A1 | 6/2002 | Miles ........................ 359/291 |
| 2002/0126364 A1 | 9/2002 | Miles ........................ 359/247 |
| 2003/0043157 A1 | 3/2003 | Miles ........................ 345/540 |
| 2003/0133284 A1 | 7/2003 | Chipchase et al. .......... 362/31 |
| 2004/0150869 A1* | 8/2004 | Kasai ........................ 359/290 |
| 2004/0234095 A1* | 11/2004 | Yun ........................... 381/412 |
| 2005/0046922 A1* | 3/2005 | Lin et al. .................... 359/291 |

FOREIGN PATENT DOCUMENTS

| CN | 1549039 | 11/2004 |
|---|---|---|
| TW | 504583 | 4/1988 |

OTHER PUBLICATIONS

China Office Action mailed Jul. 28, 2006.

* cited by examiner

*Primary Examiner*—Scott J. Sugarman
*Assistant Examiner*—Dawayne A Pinkney
(74) *Attorney, Agent, or Firm*—Thomas, Kayden, Horstemeyer & Risley

(57) ABSTRACT

An optical microelectromechanical systems (MEMS) device includes a transparent substrate with a plurality of discrete conductive lines, an dielectric layer disposed on the substrate and the conductive lines, reflective members and edge supporters. The reflective members and conductive lines are orthogonal, defining a plurality of pixel areas. Each reflective member is supported by edge supporters arranged around each pixel area and over the dielectric layer by a predetermined gap. The reflective members cover the connecting end of each edge supporter, providing protection from damage during fabrication.

24 Claims, 6 Drawing Sheets

OPTICAL MICROELECTROMECHANICAL DEVICE

This application claims the benefit of Taiwan application Serial No. 93141337, filed Dec. 30, 2004, the subject matter of which is incorporated herein by reference.

BACKGROUND

The invention relates to an optical microelectromechanical device, and in particular to an optical MEMS device with improved suspension.

U.S. Pat. Nos. 6,574,033, and 6,794,119 disclose optical microelectromechanical systems (optical MEMS) and micro-opto-electromechanical systems (MOEMS) devices comprising arrayed floating reflective members to modulate required images by interference.

FIG. 1A shows a conventional optical MEMS device, and FIG. 1B is a cross-section of section a-a in FIG. 1A. In FIGS. 1A and 1B, the conventional optical MEMS device 10 comprises a plurality of conductive wires 13 disposed on a glass substrate 12 with a dielectric layer 14 overlaid thereon. A plurality of reflective members 18 is supported by a plurality of edge supporters 16 and inner supporters 17, suspended from the dielectric layer 14 by a predetermined gap g. The conductive lines 13 are perpendicular to the reflective members 18, and the overlapping areas define a plurality of pixel areas. The edge supporters 16 of the conventional optical MEMS device 10 are located between adjacent pixel areas, crossing the boundaries thereof, such as the edge supporters 16 between pixel areas 11a and 11b in FIG. 1A. The shape, size number and profile of the inner supporters 17 within pixel areas may be different as shown in FIG. 1A to provide proper support at the center of each suspended reflective members 18.

The edge supporter 16 and inner supporter 17 are formed by residual macromolecular materials and with horizontal extending top portions 162 and 172 connect the reflective member 18 to improve adhesion therebetween and distribute stress when the reflective member 18 becomes deformed.

As shown in FIG. 1B, a specific wavelength $\lambda_1$, for example, is constructively enhanced by interference and reflected, with all other wavelengths destructively eliminated by interference when a light beam with multiple wavelengths $\lambda_1, \lambda_2, \ldots, \lambda_n$ impinges on the reflective member 18 through the glass substrate 12. The wavelength of the constructive interference depends on the gap g between the dielectric layer 14 and reflective member 18. Furthermore, the reflective member 18 becomes deformed and descended, attaching to the surface of the dielectric layer 14 as shown in FIG. 1B, when an external actuating current is supplied to the conductive layer 13. Accordingly, the reflectivity of the optical MEMS device 10 is reduced, acting as a "dark" state. Thus, the conventional optical MEMS device 10 with arrayed display units is capable of displaying required images according to external control currents.

FIG. 2 is a cross-section of section b-b in FIG. 1A before removal of the sacrificial layer 15. As shown in FIG. 2, corresponding to FIG. 1A, a plurality of openings 152 perpendicular to the dielectric layer 14, is first defined on the sacrificial layer 15 and filled with a photoresist or apolymer therein, forming edge supporters 16 and inner supporters 17.

The conventional optical MEMS device 10, however, does not provide protection to the top end connecting the reflective member 18 of each edge supporters 16. The exposed portion of each edge supporter is easily damaged by etchants or solvents during definition of the reflective members or removal of the sacrificial layer, therefore reliability of the device 10 may reduce.

SUMMARY

Accordingly, an embodiment of the invention provides an optical MEMS device with improved support, preventing from chemical or physical-chemical damages during fabrication processes while increasing reliability thereof.

Accordingly, embodiments of the invention provide an optical MEMS device comprising a conductive lines, which may be transparent, a dielectric layer, a reflective member and a plurality of edge supporters. The reflective member is supported by edge supporters and inner supporters arranged around each reflective member and suspended over the dielectric layer by a predetermined gap. The reflective member covers the connecting end of each edge supporter, thus, protecting the edge supporters from damage during fabrication.

Each edge supporter comprises a horizontal extending top portion at the end contacting the reflective members, and each top portion and the nearest edge of the reflective member are kept at least a first distance. Each edge supporter and the nearest edge of each conductive line are kept at least a second distance. The first and second distances are between 0.3 µm and 1.0 µm.

Furthermore, the predetermined gap is between about 1000 Å and 8000 Å. The optical MEMS device further comprises a plurality of inner supporters disposed between the dielectric layer and reflective members within the overlapping area thereof surrounding by the edge supporters. The edge and inner supporters comprise photoresist or a polymer. The conductive lines comprise INDIUM TIN OXIDE(ITO) or Chromium(Cr). The reflective member comprises Ag, Al, Rb(Al)x, Ni, or Cr.

Embodiments of the invention provide an optical MEMS device comprising a transparent substrate with a plurality of discrete conductive lines, a dielectric layer, reflective members and edge supporters, wherein the reflective members cover the connecting end of each edge supporter, and the conductive lines cover the other end thereof, protecting the edge supporters from damage during fabrication.

The conductive lines and the reflective member are elongated and orthogonally arranged, defining a plurality of pixel areas. Each reflective member is supported by edge supporters arranged around each pixel area and suspended over the dielectric layer by a predetermined gap. Each edge supporter comprises a horizontal extending top portion at the end contacting the reflective members, and each top portion and the nearest edge of the reflective member are kept at least a first distance. Each edge supporter and the nearest edge of each conductive line are kept least a second distance. The first and second distances are between about 0.3 µm and 1.0 µm.

Furthermore, the predetermined gap is between about 1000 Å and 8000 Å. The optical MEMS device further comprises a plurality of inner supporters disposed between the dielectric layer and reflective members within the overlapping area thereof surrounding by the edge supporters. The edge and inner supporters comprise a photoresist or a polymer. The conductive lines comprise INDIUM TIN OXIDE(ITO) or Chromium(Cr). The reflective member comprises Ag, Al, Rb(Al)x, Ni, or Cr. dr

DESCRIPTION OF THE DRAWINGS

The invention can be more fully understood by reading the subsequent detailed description in conjunction with the examples and references made to the accompanying drawings, wherein.

DETAILED DESCRIPTION

Figure 1A:
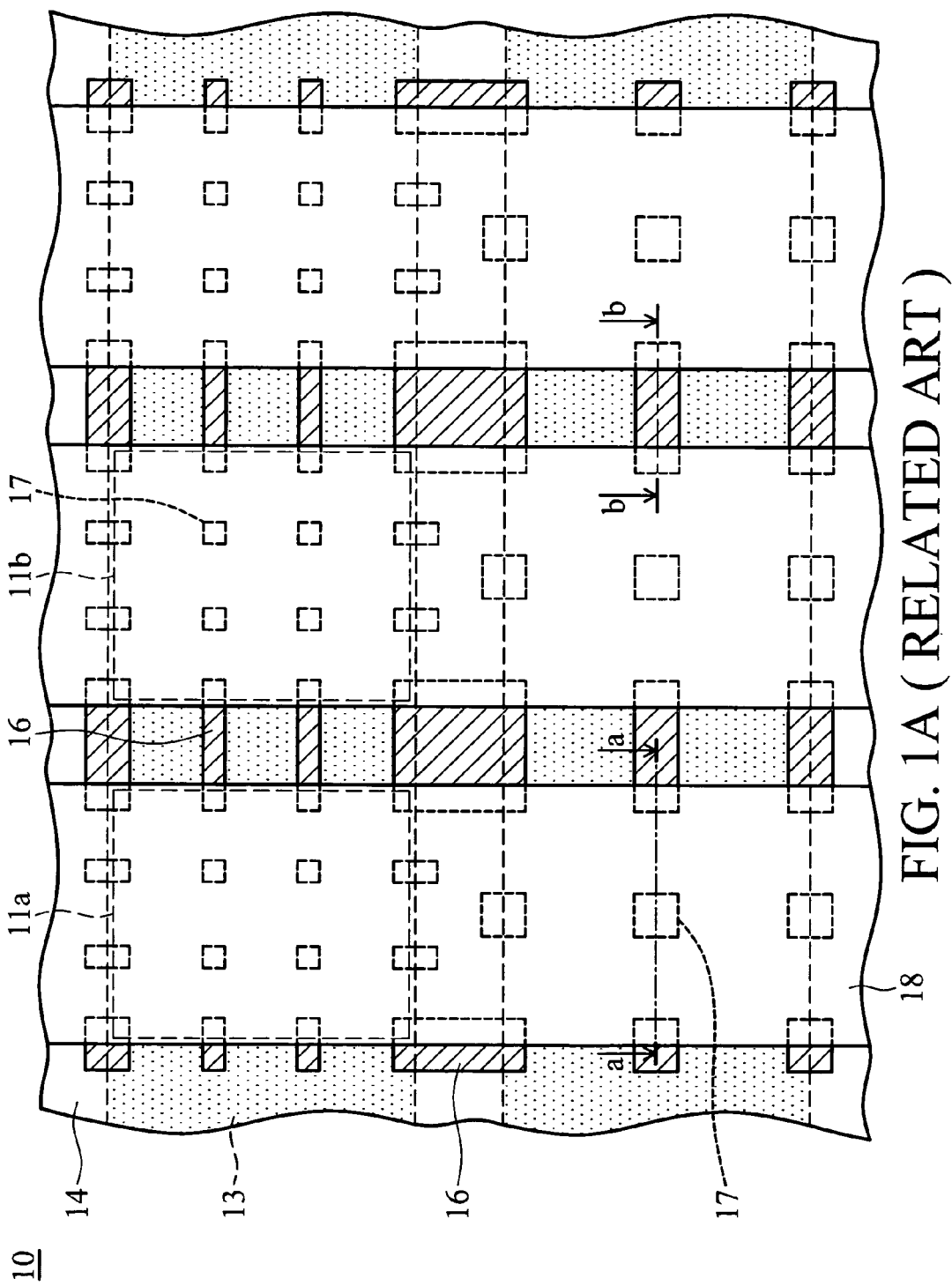
FIG. 1A is a schematic top view of a conventional optical MEMS device.
Figure 1B:
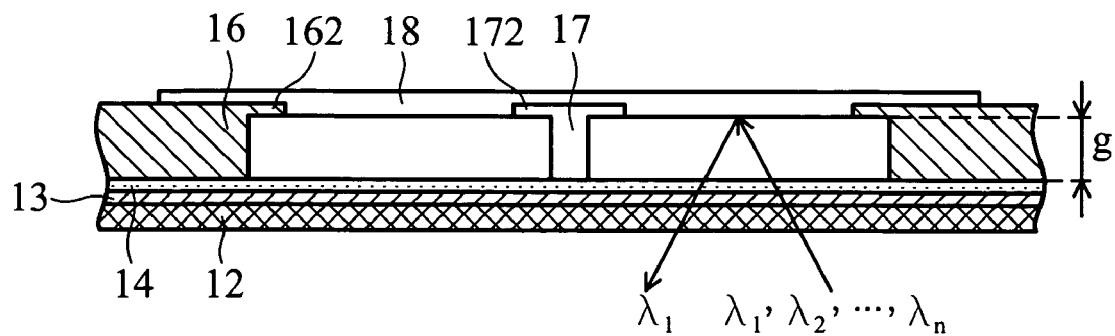
FIG. 1B is a sectional view along line a-a in FIG. 1A.
Figure 2:
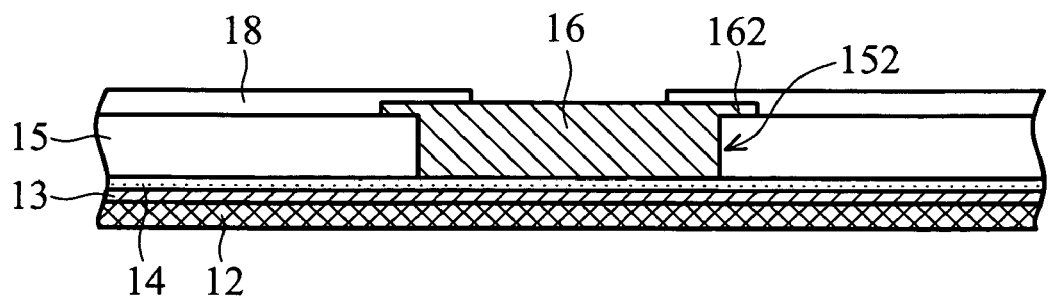
FIG. 2 is a sectional view along line b-b in FIG. 1A before removal of the sacrificial layer.
Figure 3:
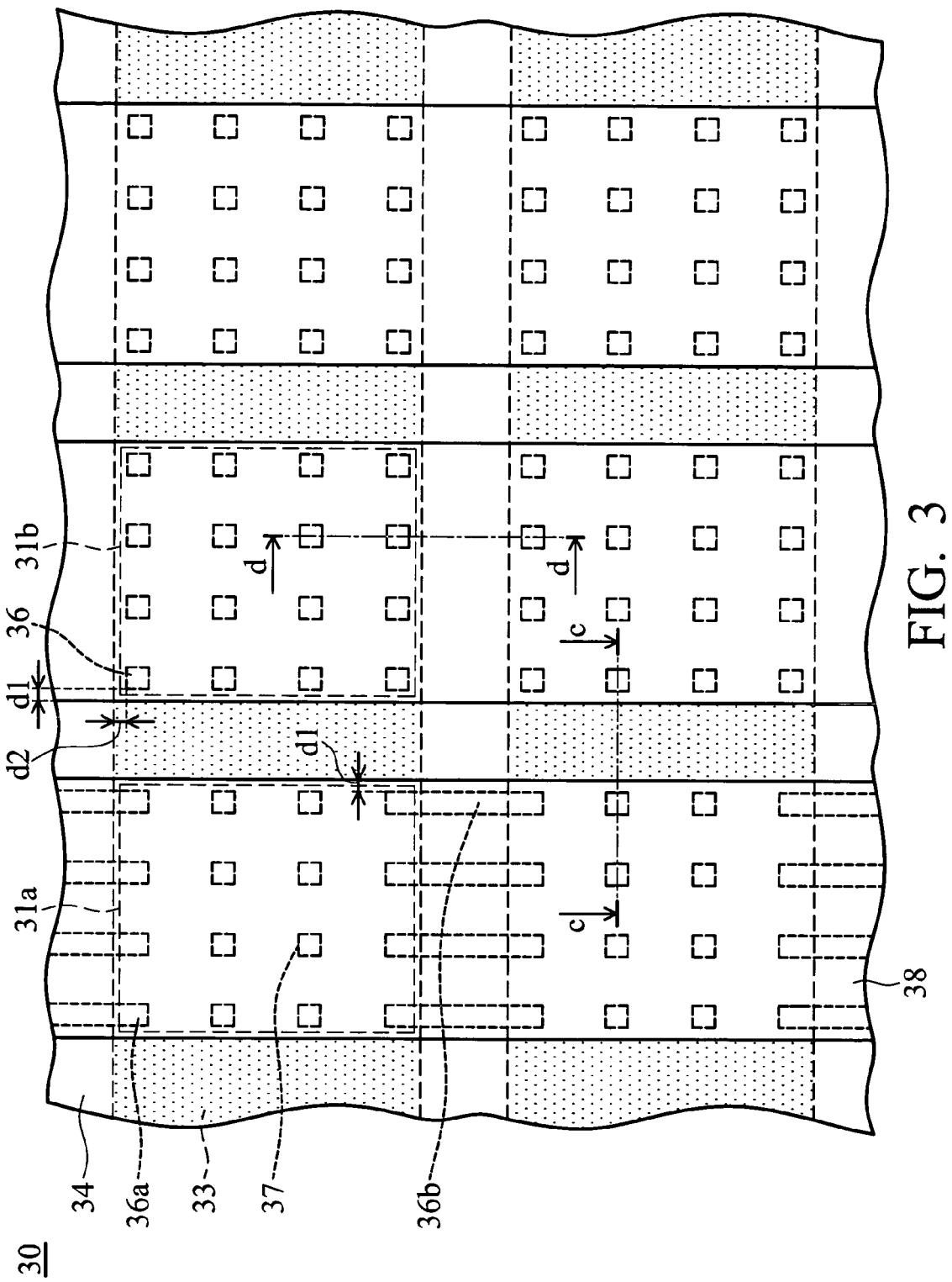
FIG. 3 is a schematic top view of an optical MEMS device in an embodiment of the invention.
Figure 4A:
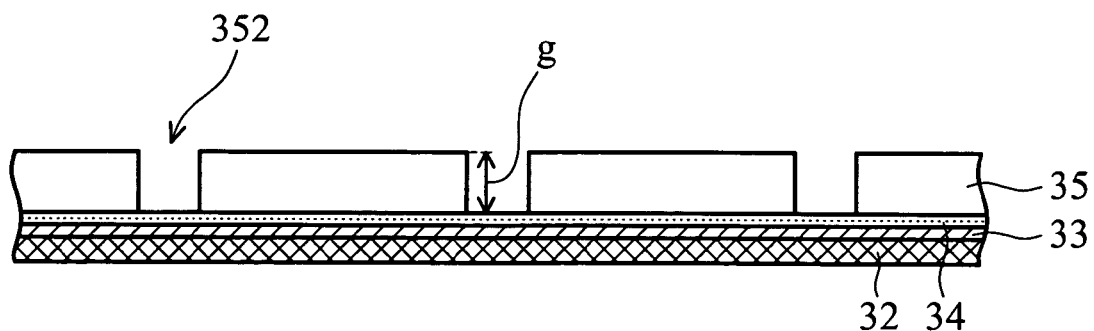
FIGS. 4A-4D are fabrication flowcharts along line c-c in FIG. 3.

FIG. 3 is a schematic top view of an optical MEMS device in an embodiment of the invention. The optical microelectromechanical systems (MEMS) device 30 comprises a transparent substrate 32, as shown in FIG. 4A, with a plurality of discrete conductive lines 33 and an overlaid dielectric layer 34. A plurality of reflective members 38 are supported by a plurality of edge supporters 36 and inner supporters 37, suspended over the dielectric layer 34 by a predetermined gap g, as shown in FIG. 4D.

The conductive lines 33 and the reflective members 38 are elongated and orthogonally arranged, thus defining a plurality of overlapping pixel areas, such as 31a and 31b. The edge supporters 36 are arranged around each pixel area or cross the boundaries of each two adjacent pixel areas. Unlike conventional structure, the reflective members 38 here cover the connecting end of the edge supporters 36. The edge supporters 36 are substantially disposed under the reflective members 38 and separated from the nearest edge of each reflective member 38 by at least a first distance $d_1$ and from the nearest edge of each conductive line 33 by at least a second distance $d_2$.

In an embodiment of the invention, the first distances $d_1$ and the second distances $d_2$ are between about 0.3 µm and 1.0 µm, such that the reflective members 38 act as protecting films at the top ends of the edge supporters 36, protecting the edge supporters 36 from damage and reflective member 38 from peeling during fabrication.

Referring to FIG. 3, some edge supporters 36 extend in a longitudinal orientation, crossing boundaries of the pixel areas, such as 36a, or two adjacent edge supporters connected together, such as 36b, thus providing better support for the elongated reflective members 38.

Furthermore, the inner supporters 37 are disposed within pixel areas surrounded by the edge supporters 36. In the embodiment shown in FIG. 3, the inner supporters 37 and the edge supporters 36 are arranged in 4×4 arrays, but the number, location, and profile thereof are not limited thereto and can be modified according to the gap between the dielectric layer 34 and the reflective members 38 and required mechanical strength.

FIGS. 4A-4D are fabrication flowcharts of section c-c in FIG. 3 in an embodiment of the invention. In FIG. 4A and referring to the FIG. 3 accordingly, a conductive layer, which may be transparent or made of INDIUM TIN OXIDE (ITO) or chromium (Cr), is first deposited on a glass substrate 32, and thus defined into several discrete conductive lines 33 of the optical MEMS device 30 by etching or other semiconductor processes on the mentioned conductive layer. Next, a dielectric layer 34 and a sacrificial layer 35 are sequentially formed on the conductive lines 33. The dielectric layer 34 may be SiOx or SiNx. The sacrificial layer 35 may be molybdenum, tantalum, germanium, or silicon. The thickness of the sacrificial layer 35 is between about 1000 Å and 8000 Å, determined by the selected reflecting wavelength. A plurality of openings 352 are then defined on the sacrificial layer 35, exposing the dielectric layer 34 for the following processes.

Figure 4B:
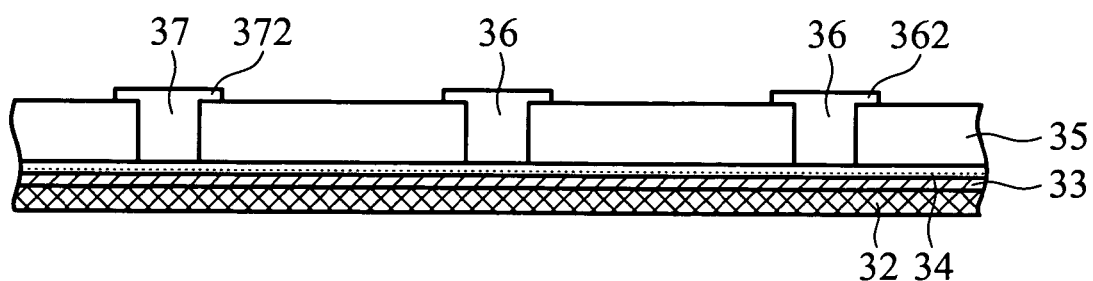

Stuffing materials are overlaid on the sacrificial layer 35, and filled in the openings 352 in FIG. 4B. A plurality of edge supporters 36 and inner supporters 37 with required horizontal top portions 362 and 372 are then defined as shown in FIG. 4B by lithography processes. The edge supporters 36 and inner supporters 37 are formed by residual of a positive photoresist, a negative photoresist, a polymer, or other materials with high etching selectivity with respect to the material of the sacrificial layer 35. After exposure and development, performing baking or UV-exposure on the supporters 36 and 37 to be hardened to make it meet required mechanical strength.

Figure 4C:
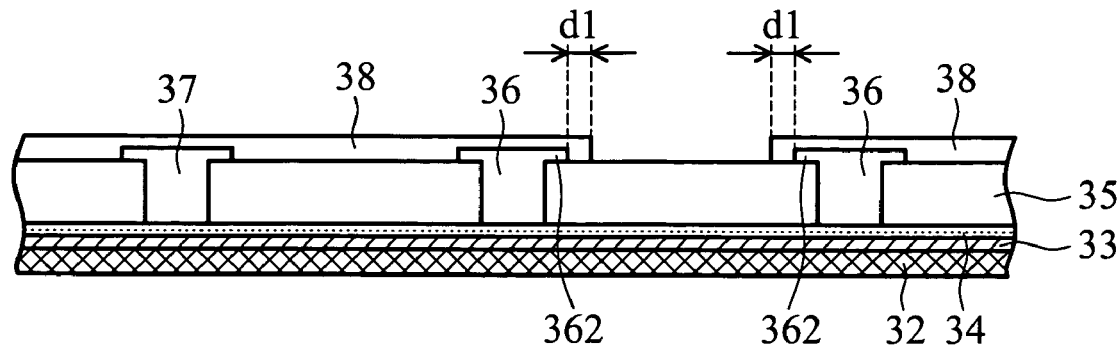
Figure 4D:
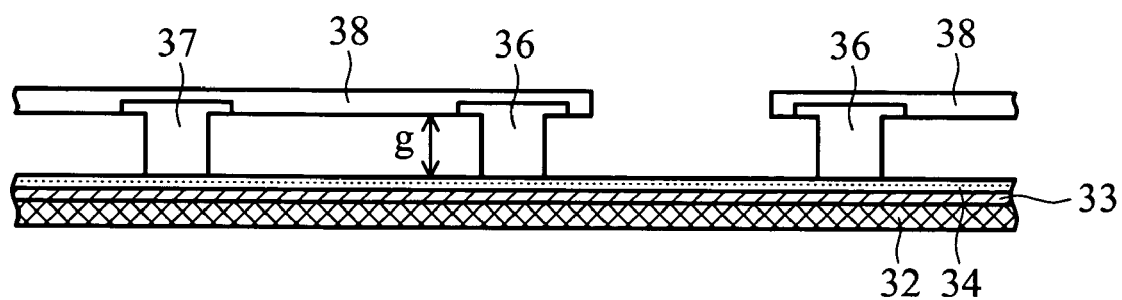

After the hardening processes, a reflective layer is formed overlaying the sacrificial layer 35, edge supporters 36, and inner supporters 37. The reflective layer is then defined with required patterns by lithography, forming a plurality of reflective members 38 as shown in FIG. 4C. The reflective members 38 are metals with high reflectivity and mechanical properties, such as Ag, Al, Rb(Al)x, Ni, or Cr. The reflective members 38 cover the connecting ends of edge supporters 36 and inner supporters 37. Moreover, the top portion 362 of each edge supporter 36 is substantially disposed under the reflective members 38 and separated from the nearest edge of each reflective member 38 by at least a first distance $d_1$ of about 0.3 µm to 1.0 µm. Thus, the reflective members 38 act as protection layers for the edge supporters 36, protecting from damages by acid or alkaline etchants, or solvents during fabrication.

In FIG. 4D, the sacrificial layer 35 is then removed by dry etching, for example, $XeFe_2$ dry etching, such that the reflective member 38 is separated from the dielectric layer 34 by a predetermined gap g, but only supported by the edge supporters 36 and inner supporters 37, thus completing the optical MEMS device 30.

Figure 5:
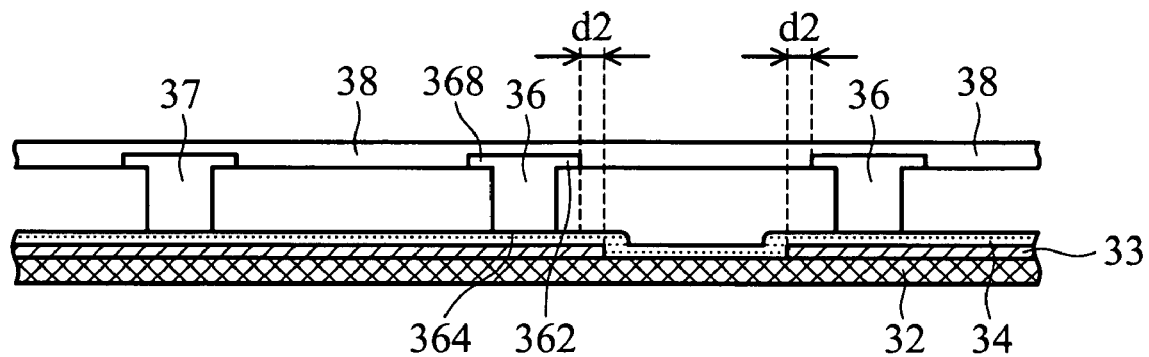
FIG. 5 is a sectional view along line d-d in FIG. 3.

FIG. 5 is a cross-section of section d-d in FIG. 3. In FIGS. 3 and 5, each edge supporter 36 connects the dielectric layer 34 at a first end 364, and reflective member 38 at a second end 368. The top portions 362 of the edge supporters 36 at the second ends are substantially covered by the reflective members 38. Furthermore, the edge of the top portion 362 and the nearest edge of the conductive lines 33 are kept least a second distance $d_2$ of about 0.3 µm to 1.0 µm.

While the invention has been described by way of example and in terms of preferred embodiment, it is to be understood that the invention is not limited thereto. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An optical microelectromechanical device, comprising:
   a substrate;
   a plurality of conductive lines disposed on the substrate;
   a dielectric layer disposed on the conductive lines;
   a plurality of reflective members perpendicular to the conductive lines and over the dielectric layer by a predetermined gap, wherein a plurality of overlapping areas of the reflective members and the conductive lines define a plurality of pixel areas; and
   a plurality of edge supporters disposed between the dielectric layer and reflective members and adjacent to the edges of each pixel area, wherein the reflective members totally cover at least one edge supporter and the edge supporter and the nearest edge of the reflective member are kept at least a first distance of about 0.3 µm to 1.0 µm.

2. The optical microelectromechanical device as claimed in claim 1, wherein the edge supporter comprises a horizontal extending top portion at the end contacting with the reflective members, and the horizontal extending top portion and the nearest edge of the reflective member is kept least a first distance of about 0.3 μm to 1.0 μm.

3. The optical microelectromechanical device as claimed in claim 1, wherein the edge supporter and the nearest edge of each conductive line is kept least a second distance of about 0.3 μm to 1.0 μm.

4. The optical microelectromechanical device as claimed in claim 1, wherein the predetermined gap is between about 1000 Å and 8000 Å.

5. The optical microelectromechanical device as claimed in claim 1, further comprising a plurality of inner supporters disposed, between the dielectric layer and reflective members within each pixel area.

6. The optical microelectromechanical device as claimed in claim 5, wherein the edge supporters and inner supporters comprise a photoresist or a polymer.

7. The optical microelectromechanical device as claimed in claim 1, wherein the conductive lines comprise INDIUM TIN OXIDE (ITO) or chromium (Cr).

8. The optical microelectromechanical device as claimed in claim 1, wherein the reflective member comprises Ag, Al, Rb(Al)x, Ni, or Cr.

9. The optical microelectromechanical device as claimed in claim 1, wherein the edge supporters directly contact with the reflective members.

10. The optical microelectromechanical device as claimed in claim 1, wherein the edge supporter is disposed between two adjacent pixel areas.

11. An optical microelectromechanical device, comprising:
   a substrate;
   a plurality of conductive lines disposed on the substrate;
   a dielectric layer disposed on the conductive lines;
   a plurality of reflective members perpendicular to the conductive lines and over the dielectric layer by a predetermined gap, wherein a plurality of overlapping areas of the reflective members and the conductive lines define a plurality of pixel areas; and
   a plurality of edge supporters disposed between the dielectric layer and reflective members and adjacent to the edges of each pixel areas, wherein at least one end of one of the edge supporters and the nearest edge of the reflective member are kept at least a first distance of about 0.3 μm to 1.0 μm, and the at least one end of one of the edge supporters and the nearest edge of each conductive line are kept at least a second distance.

12. The optical microelectromechanical device as claimed in claim 11, wherein the predetermined gap is between about 1000 Å and 8000 Å.

13. The optical microelectromechanical device as claimed in claim 11, further comprising a plurality of inner supporters disposed, between the dielectric layer and reflective members within each pixel area.

14. The optical microelectromechanical device as claimed in claim 13, wherein the edge supporters and inner supporters comprise a photoresist or a polymer.

15. The optical microelectromechanical device as claimed in claim 11, wherein the conductive lines comprise INDIUM TIN OXIDE (ITO) or chromium (Cr).

16. The optical microelectromechanical device as claimed in claim 11, wherein the reflective member comprises Ag, Al, Rb(Al)x, Ni, or Cr.

17. The optical microelectromechanical device as claimed in claim 11, wherein the edge supporter is disposed between two adjacent pixel areas.

18. An optical microelectromechanical device, comprising:
   a substrate;
   a plurality of conductive lines disposed on the substrate;
   a dielectric layer disposed on the conductive lines;
   a plurality of reflective members perpendicular to the conductive lines and over the dielectric layer by a predetermined gap, wherein a plurality of overlapping areas of the reflective members and the conductive lines define a plurality of pixel areas; and
   a plurality of edge supporters disposed between the dielectric layer and reflective members, and adjacent to the edges of each pixel areas, wherein at least one end of one of the edge supporters and the nearest edge of the reflective member are kept at least a first distance, and the at least one end of one of the edge supporters and the nearest edge of the conductive lines are kept at least a second distance of about 0.3 μm to 1.0 μm.

19. The optical microelectromechanical device as claimed in claim 18, the first distance is between about 0.3 μm to 1.0 μm.

20. The optical microelectromechanical device as claimed in claim 18, wherein the predetermined gap is between about 1000 Å and 8000 Å.

21. The optical microelectromechanical device as claimed in claim 18, further comprising a plurality of inner supporters disposed, between the dielectric layer and conductive lines within each pixel area.

22. The optical microelectromechanical device as claimed in claim 21, wherein the edge supporters and inner supporters comprise a photoresis or a polymer.

23. The optical microelectromechanical device as claimed in claim 18, wherein the conductive lines comprise INDIUM TIN OXIDE (ITO) or chromium (Cr).

24. The optical microelectromechanical device as claimed in claim 18, wherein the reflective member comprises Ag, Al, Rb(Al)x, Ni, or Cr.

* * * * *